United States Patent [19]
Higashimoto

[11] Patent Number: 5,605,093
[45] Date of Patent: Feb. 25, 1997

[54] PICKLE SOLUTION INJECTION NEEDLE

[75] Inventor: Tsuyoshi Higashimoto, Ikoma, Japan

[73] Assignee: Higashimoto Kikai Co., Ltd., Japan

[21] Appl. No.: 463,315

[22] Filed: Jun. 2, 1995

[51] Int. Cl.$^6$ .............................. A22C 9/00; A22C 17/00; A23L 1/31; A23L 3/34

[52] U.S. Cl. .................. 99/533; 99/487; 99/532

[58] Field of Search .................. 99/532–535, 516, 99/419, 487, 494; 426/281, 231; 452/146; 27/22.1, 24.1, 24.2; 604/117, 208

[56] References Cited

U.S. PATENT DOCUMENTS

| | | | |
|---|---|---|---|
| 1,485,253 | 2/1924 | Devlin | 99/532 |
| 2,544,316 | 3/1951 | Higgins | 27/24.1 |
| 3,082,681 | 3/1963 | Petersen | 99/532 |
| 3,530,785 | 9/1970 | Peters et al. | 604/117 |
| 3,777,655 | 12/1973 | Ainsworth | 99/532 |
| 4,178,660 | 12/1979 | Olney et al. | 99/494 |
| 4,190,100 | 2/1980 | Wallace | 99/533 |
| 4,258,067 | 3/1981 | Stoll et al. | 426/281 |
| 4,864,922 | 9/1989 | Higashimoto | 99/535 |
| 4,881,458 | 11/1989 | Higashimoto | 99/533 |
| 4,953,456 | 9/1990 | Prosenbauder | 452/142 |
| 5,012,728 | 5/1991 | Langen et al. | 99/535 |

*Primary Examiner*—Timothy F. Simone
*Attorney, Agent, or Firm*—Kirschstein, et al.

[57] ABSTRACT

According to the invention, there is provided an injection needle for injecting a processing solution such as a pickle solution into a food material in an apparatus for making a processed food. The injection needle comprises an elongated hollow pie including an opening end, the processing solution being fed into the hollow pipe. A tip is welded or press fitted into the opening end of the hollow pipe to thereby close the opening end. The tip includes a tapered outer surface extending from the opening end of the hollow pipe to the point of the tip to thrust the tip and the hollow pipe into the food material. The injection needle further comprises hole means formed in the tip, the hole means being communicated with the interior of the hollow pipe and opened to the tapered outer surface. Accordingly, the processing solution can be injected into the food material through the hole means in the tip.

4 Claims, 2 Drawing Sheets

PICKLE SOLUTION INJECTION NEEDLE

FIELD OF THE INVENTION

The invention relates to an injection needle for injecting a processing solution such as a pickle solution into a food material in an apparatus for making a processed food. The food material may includes a raw meat such as a raw pork or a raw beef, a raw poultry and the like. The processed food may includes a ham and the like.

PRIOR ART

In order to make a ham or the like, there has been generally used an apparatus including a plurality of injection needles adapted to be thrust into a raw meat or the like for injecting a processing solution such as a pickle solution thereinto, as disclosed in U.S. Pat. No. 4,881,458. In the apparatus in the patent, the injection needles are disposed above a feed conveyor. A raw meat is intermittently fed along the upper surface of the conveyor to the position of the injection needles. The injection needles are lowered toward and thrust into the raw meat on the conveyor.

The injection needles each comprises an elongated hollow pipe including an opening end. A pickle solution is fed into the hollow pipe when the injection needle is lowered toward the raw meat. A tip is welded or press fitted into the opening end of the hollow pipe to thereby close the opening end. The tip includes a tapered outer surface extending from the opening end of the hollow pipe to the point of the tip to thrust the tip and the hollow pipe into the raw meat. In addition, a plurality of holes are formed in the peripheral wall of the hollow pipe. Accordingly, the pickle solution is injected into the raw meat through the holes in the hollow pipe when the injecting needle is thrust into the raw meat.

The tip and the hollow pipe are firstly thrust into the upper portion of the raw meat and then lowered into the intermediate portion of the raw meat. Accordingly, the pickle solution is injected into the upper portion and the intermediate portion of the raw meat. The tip is finally lowered as far as the lowest portion of the raw meat. However, in the apparatus in the above patent, the holes are formed in the peripheral wall of the hollow pipe and therefore positioned a distance above the tip. It therefore has a problem that the holes does not reach the lowest portion of the raw meat. The holes can be merely lowered a distance above the lowest portion of the raw meat. Accordingly, the pickle solution can not be injected into the lower portion of the raw meat.

The injection needle may be used to inject a processing solution such as the pickle solution into a food material other than the raw meat in an apparatus for making a processed food other than ham.

SUMMARY OF THE INVENTION

It is an object of the invention to provide a novel and improved injection needle for injecting a processing solution such as a pickle solution into a food material in an apparatus for making a processed food, in which the processing solution is injected into not only the upper portion and the intermediate portion of the food material but also the lower portion thereof so that the processing solution can be distributed throughout the food material, resulting in high quality of the product.

According to the invention, the injection needle comprises an elongated hollow pipe including an opening end, the processing solution being fed into the hollow pipe. A tip is welded or press fitted into the opening end of the hollow pipe to thereby close the opening end. The tip includes a tapered outer surface extending from the opening end of the hollow pipe to the point of the tip to thrust the tip and the hollow pipe into the food material. The injecting needle further comprises hole means formed in the tip, the hole means being communicated with the interior of the hollow pipe and opened to the tapered outer surface. Accordingly, the processing solution can be injected into the food material through the hole means in the tip.

In a preferred embodiment, the hollow pipe has a cylindrical shape. The tip has a conical shape the base portion of which is welded or press fitted into the opening end of the hollow pipe. The tapered outer surface comprises a conical outer surface.

The hole means comprises two holes extending from the center of the base portion of the tip and inclined at an angle symmetrically to each other with respect to the axial direction.

The injection needle is typically intended to inject a processing solution such as the pickle solution into a raw meat or the like in an apparatus for making a ham or the like.

DESCRIPTION OF THE PREFERRED EMBODIMENT

Figure 1:
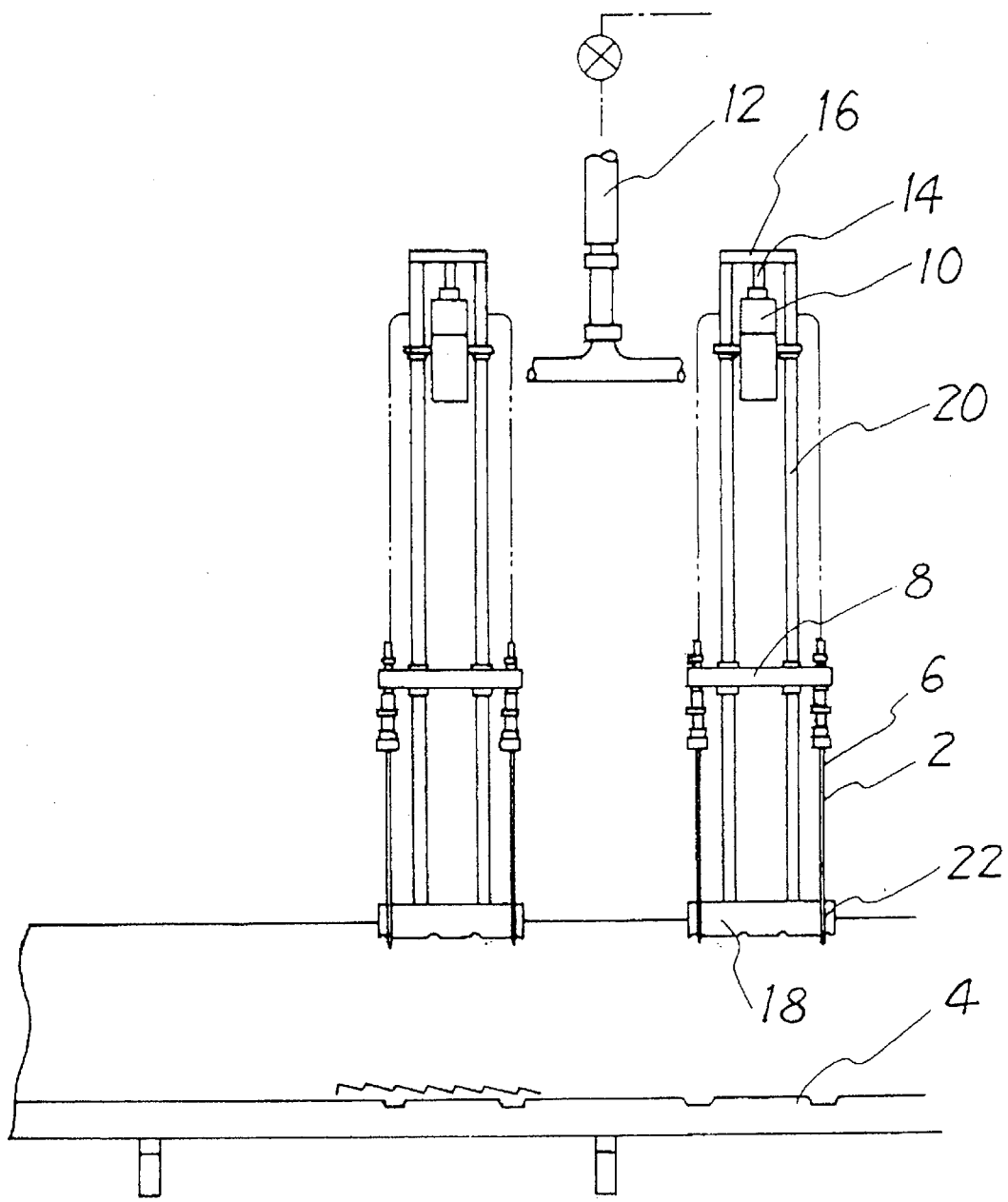
FIG. 1 is a side view of a preferred embodiment of the invention.

Referring to FIG. 1, an apparatus for making a ham or the like is shown. The apparatus includes a plurality of injection needles 2 disposed above a feed conveyor 4. A raw meat such as a raw pork or a raw beef is intermittently fed along the upper surface of the conveyor to the position of the injection needles 2.

The injection needles 2 each comprises an elongated hollow pipe 6 extending vertically and mounted on a bracket 8 which is fixedly connected to an injection head 10 by means of connecting means not shown. The injection head 10 is operatively connected to and lowered by a drive such as a crank and link means moved by a AC servo motor so that the injection needles 2 are lowered toward and thrust into the raw meat on the conveyor 4.

A pickle solution supply hose 12 is connected to the injection head 10 which is in turn connected to the hollow pipe 6 so that a pickle solution can be fed into the hollow pipe 6 from the supply hose 12 through the injection head 10. In addition, the injection head 10 includes a valve stem 14 which is engaged with and moved downwardly by a bar 16 to stop the pickle solution in the injection head 10. The bar 16 is fixedly connected to a plate 18 by means of rods 20. The plate 18 includes a plurality of holes 22 in which the injection needles 2 are inserted. Accordingly, the plate 18 is lowered toward the raw meat on the conveyor 4 when the injection head 10 are lowered by the drive. The plate 18 is then pushed against and stopped by the raw meat. The plate 18, the rods 20 and the bar 16 are not lowered any more. The injection head 10 is further lowered so that the injection needles 2 are thrust into the raw meat. The valve stem 14 is also further lowered and therefore disengaged from the bar 16 so that the pickle solution is fed into the hollow pipes 6 through the injection head 10 when the injection needles 2 are thrust into the raw meat.

Figure 2:
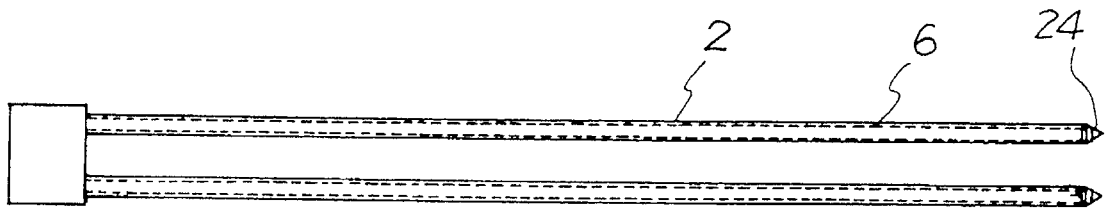
FIG. 2 is a front view of injection needles of FIG. 1.
Figure 3:
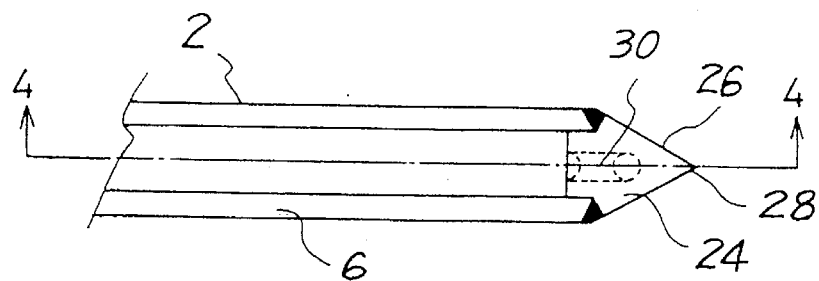
FIG. 3 is an enlarged sectional view of the injection needle of FIG. 2.

In each of the injection needles 2, the hollow pipe 6 has a cylindrical shape and includes an opening end. The injection needles 2 each further comprises a tip 24 having a conical shape the base portion of which is welded or press fitted into the opening end of the hollow pipe 6 to thereby close the opening end, as shown in FIGS. 2 and 3. The tip 24 includes a tapered outer surface 26 which comprises a conical outer surface and extends from the opening end of the hollow pipe 6 to the point 28 of the tip 24 to thrust the tip 24 and the hollow pipe 6 into the raw meat.

Figure 4:
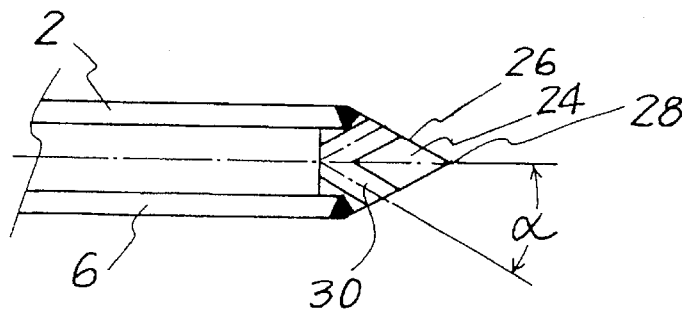
FIG. 4 is an enlarged sectional view along the line 4—4 in FIG.3.

The injection needle 2 further comprises two holes 30 formed in the tip 24, extending from the center of the base portion of the tip 24 and inclined at an angle α symmetrically to each other with respect to the axial direction as shown in FIG. 4 so that the holes 30 are communicated with the interior of the hollow pipe 6 and opened to the tapered outer surface 26.

Accordingly, in the injection needle 2, the pickle solution is injected into the raw meat through the holes 30 in the tip 24 when the tip 24 is thrust into the raw meat. The tip 24 is firstly thrust into the upper portion of the raw meat and then lowered into the intermediate portion of the raw meat. The pickle solution is therefore injected into the upper portion and the intermediate portion of the raw meat. The tip 24 is finally lowered as far as the lowest portion of the raw meat. The pickle solution is therefore injected not only the upper portion and the intermediate portion of the raw meat but also the lower portion thereof, through the holes 30 in the tip 24. The pickle solution can be distributed throughout the raw meat. This results in high quality of the product.

It will be understood that the injection needle 2 may be used to inject a processing solution such as the pickle solution into a food material other than the raw meat. It can inject the processing solution into a raw poultry or the like in an apparatus for making a processed food other than ham.

What is claimed is:

1. An injection needle for injecting a processing solution such as a pickle solution into a food material in an apparatus for making a processed food, comprising:

an elongated hollow pipe including an opening end, said processing solution being fed into said hollow pipe;

a tip welded or press fitted into said opening end of said hollow pipe to thereby close said opening end, said tip including a tapered outer surface extending from said opening end of said hollow pipe to the point of said tip to thrust said tip and said hollow pipe into said food material; and hole means formed in said tip, said hole means being communicated with the interior of said hollow pipe and opened to said tapered outer surface, whereby said processing solution can be injected into said food material through said hole means in said tip.

2. An injection needle as set forth in claim 1, wherein said hollow pipe has a cylindrical shape, said tip having a conical shape the base portion of which is welded or press fitted into said opening end of said hollow pipe, said tapered outer surface comprising a conical outer surface.

3. An injection needle as set forth in claim 2, wherein said hole means comprises two holes extending from the center of said base portion of said tip and inclined at an angle symmetrically to each other with respect to the axial direction.

4. An injection needle for injecting a processing solution such as a pickle solution into a raw meat in an apparatus for making a ham comprising:

an elongated hollow pipe having a cylindrical shape and including an opening end, said processing solution being fed into said hollow pipe;

a tip having a conical shape the base portion of which is welded or press fitted into said opening end of said hollow pipe to thereby close said opening end, said tip including a tapered outer surface comprising a conical outer surface and extending from said opening end of said hollow pipe to the point of said tip to thrust said tip and said hollow pipe into said raw meat; and two holes formed in said tip, extending from the center of said base portion of said tip and inclined at an angle symmetrically to each other with respect to the axial direction so that said holes are communicated with the interior of said hollow pipe and opened to said tapered outer surface, whereby said pickle solution can be injected into said raw meat through said holes in said tip.

* * * * *